(12) United States Patent
Gai et al.

(10) Patent No.: US 7,395,332 B2
(45) Date of Patent: *Jul. 1, 2008

(54) METHOD AND APPARATUS FOR HIGH-SPEED PARSING OF NETWORK MESSAGES

(75) Inventors: Silvano Gai, Vigliano d'Asti (IT); Thomas J. Edsall, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 488 days.

This patent is subject to a terminal disclaimer.

(21) Appl. No.: 11/085,768

(22) Filed: Mar. 21, 2005

(65) Prior Publication Data

US 2005/0165966 A1    Jul. 28, 2005

Related U.S. Application Data

(63) Continuation of application No. 09/535,810, filed on Mar. 28, 2000, now Pat. No. 6,892,237.

(51) Int. Cl.
*G06F 15/173* (2006.01)

(52) U.S. Cl. .................. 709/224; 709/223; 709/231; 711/108; 711/120

(58) Field of Classification Search .................. 709/223, 709/224, 231; 711/108, 120
See application file for complete search history.

(56) References Cited

U.S. PATENT DOCUMENTS

| | | | |
|---|---|---|---|
| 4,071,887 A | 1/1978 | Daly et al. | |
| 4,404,557 A | 9/1983 | Grow | |
| 4,495,617 A | 1/1985 | Ampulski et al. | |
| 4,512,014 A | 4/1985 | Binz et al. | |
| 4,530,091 A | 7/1985 | Crockett | |
| 4,536,876 A | 8/1985 | Bahr et al. | |
| 4,539,679 A | 9/1985 | Bux et al. | |
| 4,543,630 A | 9/1985 | Neches | |
| 4,549,291 A | 10/1985 | Renoulin et al. | |
| 4,590,554 A | 5/1986 | Glazer et al. | |
| 4,598,400 A | 7/1986 | Hillis | |
| 4,604,742 A | 8/1986 | Hamada et al. | |
| 4,609,920 A | 9/1986 | Segarra | |
| 4,663,748 A | 5/1987 | Karbowiak et al. | |
| 4,677,614 A | 6/1987 | Circo | |
| 4,680,757 A | 7/1987 | Murakami et al. | |
| 4,704,680 A | 11/1987 | Saxe | |
| 4,709,327 A | 11/1987 | Hillis et al. | |
| 4,709,364 A | 11/1987 | Hasegawa et al. | |
| 4,713,807 A | 12/1987 | Caves et al. | |
| 4,746,920 A | 5/1988 | Nellen et al. | |
| 4,747,130 A | 5/1988 | Ho | |
| 4,754,395 A | 6/1988 | Weisshaar et al. | |
| 4,771,423 A | 9/1988 | Ohya et al. | |
| 4,773,038 A | 9/1988 | Hillis et al. | |

(Continued)

OTHER PUBLICATIONS

Application Prioritization, Top Layer Networks, Inc., (c) 1999, pp. 1-8.

(Continued)

*Primary Examiner*—Phuoc H Nguyen
(74) *Attorney, Agent, or Firm*—Cesari and McKenna LLP

(57) ABSTRACT

A method for searching network messages for pre-defined regular expressions is disclosed. A plurality of pre-defined regular expressions are stored in a content-addressable memory (CAM). A network message or selected portion thereof is inputted to the CAM for comparison with all of the regular expressions stored therein, the comparison with all CAM entries being done at the same time. An output is returned from the CAM. In response to the output from the CAM, identifying an action to be applied to the given network message or portion thereof that corresponds to a CAM entry matching the inputted network message or selected portion thereof.

38 Claims, 6 Drawing Sheets

U.S. PATENT DOCUMENTS

| | | |
|---|---|---|
| 4,791,641 A | 12/1988 | Hillis |
| 4,805,091 A | 2/1989 | Thiel et al. |
| 4,805,167 A | 2/1989 | Leslie et al. |
| 4,809,202 A | 2/1989 | Wolfram |
| 4,814,762 A | 3/1989 | Franaszek |
| 4,815,110 A | 3/1989 | Benson et al. |
| 4,833,468 A | 5/1989 | Larson et al. |
| 4,864,559 A | 9/1989 | Perlman |
| 4,870,568 A | 9/1989 | Kahle et al. |
| 4,922,418 A | 5/1990 | Dolecek |
| 4,922,486 A | 5/1990 | Lidinsky et al. |
| 4,926,446 A | 5/1990 | Grover et al. |
| 4,930,121 A | 5/1990 | Shiobara |
| 4,949,239 A | 8/1990 | Gillett, Jr. et al. |
| 4,954,988 A | 9/1990 | Robb |
| 4,965,717 A | 10/1990 | Cutts, Jr. et al. |
| 4,993,028 A | 2/1991 | Hillis |
| 5,014,265 A | 5/1991 | Hahne et al. |
| 5,018,137 A | 5/1991 | Backes et al. |
| 5,027,350 A | 6/1991 | Marshall |
| 5,067,078 A | 11/1991 | Talgam et al. |
| 5,070,446 A | 12/1991 | Salem |
| 5,072,422 A | 12/1991 | Rachels |
| 5,088,032 A | 2/1992 | Bosack |
| 5,093,801 A | 3/1992 | White et al. |
| 5,111,198 A | 5/1992 | Kuszmaul |
| 5,113,510 A | 5/1992 | Hillis |
| 5,117,420 A | 5/1992 | Hillis et al. |
| 5,129,077 A | 7/1992 | Hillis |
| 5,148,547 A | 9/1992 | Kahle et al. |
| 5,151,996 A | 9/1992 | Hillis |
| 5,157,663 A | 10/1992 | Major et al. |
| 5,175,865 A | 12/1992 | Hillis |
| 5,212,773 A | 5/1993 | Hillis |
| 5,222,216 A | 6/1993 | Parish et al. |
| 5,222,237 A | 6/1993 | Hillis |
| 5,224,099 A | 6/1993 | Corbalis et al. |
| 5,247,613 A | 9/1993 | Bromley |
| 5,247,694 A | 9/1993 | Dahl |
| 5,255,291 A | 10/1993 | Holden et al. |
| 5,261,105 A | 11/1993 | Pottet et al. |
| 5,265,207 A | 11/1993 | Zak et al. |
| 5,274,631 A | 12/1993 | Bhardwaj |
| 5,280,470 A | 1/1994 | Buhrke et al. |
| 5,289,156 A | 2/1994 | Ganmukhi |
| 5,295,258 A | 3/1994 | Jewett et al. |
| 5,301,310 A | 4/1994 | Isman et al. |
| 5,317,726 A | 5/1994 | Horst |
| 5,325,487 A | 6/1994 | Au et al. |
| 5,331,637 A | 7/1994 | Francis et al. |
| 5,349,680 A | 9/1994 | Fukuoka |
| 5,353,283 A | 10/1994 | Tsuchiya |
| 5,355,492 A | 10/1994 | Frankel et al. |
| 5,357,612 A | 10/1994 | Alaiwan |
| 5,359,592 A | 10/1994 | Corbalis et al. |
| 5,361,256 A | 11/1994 | Doeringer et al. |
| 5,361,363 A | 11/1994 | Wells et al. |
| 5,367,692 A | 11/1994 | Edelman |
| 5,388,214 A | 2/1995 | Leiserson et al. |
| 5,388,262 A | 2/1995 | Hillis |
| 5,390,298 A | 2/1995 | Kuszmaul et al. |
| 5,394,402 A | 2/1995 | Ross |
| 5,404,296 A | 4/1995 | Moorhead |
| 5,404,562 A | 4/1995 | Heller et al. |
| 5,410,723 A | 4/1995 | Schmidt et al. |
| 5,414,704 A | 5/1995 | Spinney |
| 5,428,761 A | 6/1995 | Herlihy et al. |
| 5,440,752 A | 8/1995 | Lentz et al. |
| 5,442,633 A | 8/1995 | Perkins et al. |
| 5,455,932 A | 10/1995 | Major et al. |
| 5,473,607 A | 12/1995 | Hausman et al. |
| 5,475,856 A | 12/1995 | Kogge |
| 5,485,627 A | 1/1996 | Hillis |
| 5,499,384 A | 3/1996 | Lentz et al. |
| 5,500,860 A | 3/1996 | Perlman et al. |
| 5,511,168 A | 4/1996 | Perlman et al. |
| 5,530,809 A | 6/1996 | Douglas et al. |
| 5,535,408 A | 7/1996 | Hillis |
| 5,561,669 A | 10/1996 | Lenney et al. |
| 5,566,170 A | 10/1996 | Bakke et al. |
| 5,568,380 A | 10/1996 | Brodnax et al. |
| 5,583,996 A | 12/1996 | Tsuchiya |
| 5,600,644 A | 2/1997 | Chang et al. |
| 5,612,959 A | 3/1997 | Takase et al. |
| 5,613,136 A | 3/1997 | Casavant et al. |
| 5,615,360 A | 3/1997 | Bezek et al. |
| 5,617,421 A | 4/1997 | Chin et al. |
| 5,617,538 A | 4/1997 | Heller |
| 5,621,885 A | 4/1997 | Del Vigna, Jr. |
| 5,627,965 A | 5/1997 | Liddell et al. |
| 5,633,858 A | 5/1997 | Chang et al. |
| 5,633,866 A | 5/1997 | Callon |
| 5,673,423 A | 9/1997 | Hillis |
| 5,684,800 A | 11/1997 | Dobbins et al. |
| 5,710,814 A | 1/1998 | Klemba et al. |
| 5,740,171 A | 4/1998 | Mazzola et al. |
| 5,742,604 A | 4/1998 | Edsall et al. |
| 5,748,936 A | 5/1998 | Karp et al. |
| 5,748,963 A | 5/1998 | Orr |
| 5,751,955 A | 5/1998 | Sonnier et al. |
| 5,758,148 A | 5/1998 | Lipovski |
| 5,764,636 A | 6/1998 | Edsall |
| 5,781,715 A | 7/1998 | Sheu |
| 5,781,753 A | 7/1998 | McFarland et al. |
| 5,787,243 A | 7/1998 | Stiffler |
| 5,787,255 A | 7/1998 | Parlan et al. |
| 5,796,732 A | 8/1998 | Mazzola et al. |
| 5,796,740 A | 8/1998 | Perlman et al. |
| 5,812,811 A | 9/1998 | Dubey et al. |
| 5,818,842 A | 10/1998 | Burwell et al. |
| 5,828,844 A | 10/1998 | Civanlar et al. |
| 5,832,291 A | 11/1998 | Rosen et al. |
| 5,838,915 A | 11/1998 | Klausmeier et al. |
| 5,842,040 A | 11/1998 | Hughes et al. |
| 5,852,607 A | 12/1998 | Chin |
| 5,860,086 A | 1/1999 | Crump et al. |
| 5,872,963 A | 2/1999 | Bitar et al. |
| 5,898,686 A | 4/1999 | Virgile |
| 5,909,441 A | 6/1999 | Alexander, Jr. et al. |
| 5,909,550 A | 6/1999 | Shankar et al. |
| 5,941,988 A | 8/1999 | Bhagwat et al. |
| 5,953,512 A | 9/1999 | Cai et al. |
| 5,960,211 A | 9/1999 | Schwartz et al. |
| 6,035,422 A | 3/2000 | Hohl et al. |
| 6,067,569 A | 5/2000 | Khaki et al. |
| 6,169,999 B1 | 1/2001 | Kanno |
| 6,381,673 B1 | 4/2002 | Srinivasan et al. |
| 6,389,507 B1 | 5/2002 | Sherman |
| 6,480,931 B1 | 11/2002 | Buti et al. |
| 6,510,509 B1 | 1/2003 | Chopra et al. |
| 6,549,957 B1 * | 4/2003 | Hanson et al. ................. 710/5 |
| 6,564,289 B2 | 5/2003 | Srinivasan et al. |
| 6,574,702 B2 | 6/2003 | Khanna et al. |
| 6,591,331 B1 * | 7/2003 | Khanna ..................... 711/108 |
| 7,245,623 B1 * | 7/2007 | Cheriton ..................... 711/108 |

OTHER PUBLICATIONS

Application Control, Top Layer Networks, Inc., (c) 1999, pp. 1-8.
Classifying Custom Applications with 7 Layer Application Control, Top Layer Networks, Inc., (c) 1999, pp. 1-8.
Custom ASIC Design Enables 7 Layer Application Control, Top Layer Networks, Inc., (c) 1999, pp. 1-5.

Implementing Qos for Business Driven Networks, Top Layer Networks, Inc., (c) 1999, pp. 1-7.
AppSwitch Data Sheet, Top Layer Networks, Inc., (c) 1999, pp. 1-8.
The Need for Classifying Applications Using 7 Layer Application Control, Top Layer Networks, Inc., (c) 1999, pp. 1-19.
Press Release-Data Communications and Internetweek Editors Name Top Layer Networks' "App Switch" A Winner of the best of Show Awards at Networld + Interop 99 Las Vegas, Top Layer Networks, Inc., (c) 1999, pp. 1-2.
Wallace, Bob, Load Balancing, http://www.computerworld.com/home/features.nf, ComputerWorld, (c) 1999, pp. 1-4.
Foundry Networks Announces Net Generation Layer 4-7 Products, http://biz.yahoo.com/991115/ca_foundry_1.html, Business Wire (c) 1994-1999, pp. 1-3.
Curtone, Vic, AppSwitch Does Layer 7 Switching, Network Computing, May 3, 1999, pp. 1-3.
Layer 4 Switching: Unraveling the 'Vendorspeak', http://www.networking.com/shared/pr . . . cle?, Cisco Engineers, May 3, 1999, pp. 1-3.
Regex, http://www.ca.utah.edu/dept/old/textinfo/regez, (c) 1992, pp. 1035.
Perl5 Regular Expression Description, http://language.perl.com/all_about/regexps.html, (c) 1994-1996, pp. 1-14.
Perl Regular Expression Tutorial, http://www.meurrens.org/ip-Links/Java/regex/Perl/regex2a.html., (c) 1994-1996, pp. 1-8.
T.V. Lakshman and D. Stilliadis, High-Speed Policy-based Packet Forwarding Using Efficient Multi-dimensional Range Matching, 1998, pp. 203-214.
Dawson R. Engler and M. Frans Kaashoek, DPF: Fast, Flexible Message Demultiplexing using Dynamic Code Generation, 1996, pp. 53-59.
Pankaj Gupta and Nick McKeown, Packet Classification on Multiple Fields.
World Wide Web page http://www.synopsys.com/products/analysis/pt_tech_bgr.html, Prime Time Full-Chip Static Timing Analyzer, Jul. 12, 1999, pp. 1-17.
World Wide Web page http://www.synopsys.com/products/analysis/sta_wp.html, Static Timing Verification: Methodology Overview, Jul. 12, 1999, pp. 1-13.
World Wide Web page http://www.synopsys.com/products/analysis/primtime_cs.html, PrimeTime: Full-Chip, Gate-Level Static Timing Analysis, Jul. 12, 1999, pp. 1-2.
World Wide Web page http://www.synopsys.com/products/analysis/primtime_ds.html, Prime Time, Jul. 12, 1999, pp. 1-7.
Computer Architecture The Anatomy of Modern Processors, Pipeline Hazards, world wide web page http://ciips.ee.uwa.edu.au/morris/CA406/pipe_hazard.html, 1999, pp. 1-6.
Cisco Catalyst Workgroup Switch Version 3.0, web, http://www.cisco.com/warp/public/558/16.html, pp. 1-5.
Cisco VLAN Roadmap, web, http://www.cisco.com/warp/public/538/7.html, pp. 1-9.
IAC (SM) Newsletter Database (TM) Communications Industry Researchers, Broadband Networks and Applications, copyright 1995 Information Access Company, a Thomson Corporation Company, Section No. 16, vol. E; ISSN: 1059-0544, Headline, Cisco Announces New Fast Ethernet Interface, pp. 2-3.
IAC (SM) Newsletter Database (TM) Communications Industry Researchers, Broadband Networks and Applications, copyright 1995 Information Access Company, a Thomson Corporation Company, Section No. 16, vol. 3; ISSN: 1059-0544, Headline, Cisco Announces Token-Ring Switching Products, pp. 4-5.
Cisco 7000 Series Gains Fast Ethernet Interface, Becomes Only Router Family to Support Three High-Speed Network Types, web, http://www.cisco.com/warp/public/146/199.html pp. 1-2.
ISL Functional Specification, web, http://www.cisco.com/warp/public/741/4.htm, pp. 1-4.
Cisco-Catalyst 5000 Software Release 2.1 Feature Set, web, http://www.cisco.com/warp/public/729/c5000/426_pp.htm, pp. 1-9.
IEEE Standard Project P802.1Q,Draft Standard for Virtual Bridged Local Area Networks, Copyright by the Institute of Electrical and Electronics Engineers, Inc., Feb. 28, 1997, pp. 1-88.
Draft Standard P. 802.1Q/D10, IEEE Standards for Local and Metropolitan Area Networks: Virtual Bridged Local Area Networks, Copyright by the Institute of Electrical and Electronics Engineers, Inc., Mar. 22, 1997, pp. 1-212.
ISL Configurations for Cisco IOS and the Catalyst 5000, web, http://www.cisco.com/warp/public/741/8.html, pp. 1-8.
Dynamic Inter-Switch Link Protocol, 2.2 Configuration Note, pp. 2-6.
Virtual LANs, Catalyst 2820 Series and Catalyst 1900 Series Enterprise Edition Software Configuration Guide, Chapter 2, pp. 2-1-2-49.
Configuring VTP and Virtual LANs, Catalyst 5000 Series Software Configuration Guide, Chapter 13, pp. 13-1-13-24.
IEEE 1149.1 Device Architecture, http://www.asset-intertech.com/homepage/bscanturu/arch.htm, pp. 1-3, 1998.
IEEE 1149.1 Device Architecture (continued), Using the Instruction Register (IR), http://www.asset-intertech.com/homepage/bscantutr/arch2.htm#UsingIR, pp. 1-4, 1998.
The Principle of Boundary-Scan Architecture, http://www.asset-intertech.com/homepage/bscantutr/principl.htm, pp. 1-4, 1998.
IEEE 1149.1 Device Architecture (continued), The Test Access Port (TAP), http://www.asset-intertech.com/homepage/bscantutr/arch3.htm#TAP, pp. 1-3, 1998.
Digital Systems Testing and Testable Design, Miron Abramovici, et al., Computer Science Press, pp. 342-409, Copyright 1990.

* cited by examiner

METHOD AND APPARATUS FOR HIGH-SPEED PARSING OF NETWORK MESSAGES

RELATED APPLICATIONS

This Application is a Continuation of U.S. patent application Ser. No. 09/535,810 filed on Mar. 28, 2000, now issued as U.S. Pat. No. 6,892,237, on May 10, 2005.

BACKGROUND OF THE INVENTION

1. Field of the Invention

The present invention relates generally to the field of computer networks, and more specifically, to a mechanism for performing pattern matching on network messages at high speed.

2. Background Information

Enterprises, including businesses, governments and educational institutions, rely on computer networks to share and exchange information. A computer network typically comprises a plurality of entities interconnected by a communications media. An entity may consist of any device, such as a host or end station, that sources (i.e., transmits) and/or receives network messages over the communications media. A common type of computer network is a local area network ("LAN") which typically refers to a privately owned network within a single building or campus. In many instances, several LANs may be interconnected by point-to-point links, microwave transceivers, satellite hook-ups, etc. to form a wide area network ("WAN") or subnet that may span an entire city, country or continent. One or more intermediate network devices are often used to couple LANs together and allow the corresponding entities to exchange information. A bridge, for example, may be used to provide a "bridging" function between two or more LANs. Alternatively, a switch may be utilized to provide a "switching" function for transferring information between a plurality of LANs at higher speed.

Typically, the bridge or switch is a computer that includes a plurality of ports, which may be coupled to the LANs. The switching function includes receiving data at a source port that originated from a sending entity, and transferring that data to at least one destination port for forwarding to a receiving entity. Conventional bridges and switches operate at the data link layer (i.e., Layer 2) of the communications protocol stack utilized by the network, such as the Transmission Control Protocol/Internet Protocol (TCP/IP) Reference Model.

Another intermediate network device is called a router. A router is often used to interconnect LANs executing different LAN standards and/or to provide higher level functionality than bridges or switches. To perform these tasks, a router, which also is a computer having a plurality of ports, typically examines the destination address and source address of messages passing through the router. Routers typically operate at the network layer (i.e., Layer 3) of the communications protocol stack utilized by the network, such as the Internet Protocol (IP). Furthermore, if the LAN standards associated with the source entity and the destination entity are different (e.g., Ethernet versus Token Ring), the router may also re-write (e.g., alter the format of) the packet so that it may be received by the destination entity. Routers also execute one or more routing protocols or algorithms, which are used to determine the paths along which network messages are sent.

Computer networks are frequently being used to carry traffic supporting a diverse range of applications, such as file transfer, electronic mail, World Wide Web (WWW) and Internet applications, voice over IP (VoIP) and video applications, as well as traffic associated with mission-critical and other enterprise-specific applications. Accordingly, network managers are seeking ways to identify specific traffic flows within their networks so that more important traffic (e.g., traffic associated with mission-critical applications) can be identified and given higher priority to the network's resources as compared with other less critical traffic (such as file transfers and email). In addition, as computer networks get larger, there is also a need to balance the load going to various servers, such as web-servers, electronic mail servers, database servers and firewalls, so that no single device is overwhelmed by a burst in requests. Popular Web sites, for example, typically employ multiple web servers in a load-balancing scheme. If one server starts to get swamped, requests are forwarded to another server with available capacity.

Layer 4 switches or routers have been specifically developed to perform such services. In a Layer 4 switch, the device examines both the network and transport layer headers of network messages to identify the flow to which the messages belong. Such flows are often identified by examining five network/transport layer parameters (i.e., IP source address, IP destination address, source port, destination port and transport layer protocol). By examining these five parameters, a layer 4 switch can often identify the specific entities that are communicating and the particular upper layer (e.g., Layer 7) application being used by those entities. In particular, a defined set of well-known port numbers has been established at Request for Comments (RFC) 1700 for certain common applications. For example, port number 80 corresponds to the hypertext transport protocol (HTTP), which is commonly used with WWW applications, while port number 21 corresponds to the file transfer protocol (FTP).

The parsing of data packets so as to identify these network/transport layer parameters is typically performed in software by a dedicated module or library. The Internetwork Operating System (IOS®) from Cisco Systems, Inc. of San Jose, Calif., for example, includes software modules or libraries for performing such packet parsing functions. A processor, such as a central processing unit (CPU), at the network device executes the corresponding program instructions. These modules or libraries may be written in any number of well-known programming languages. The Perl programming language, in particular, is often selected because of its highly developed pattern matching capabilities. In Perl, the patterns that are being searched for are generally referred to as regular expressions. A regular expression can simply be a word, a phrase or a string of characters. More complex regular expressions include metacharacters that provide certain rules for performing the match. The period ("."), which is similar to a wildcard, is a common metacharacter. It matches exactly one character, regardless of what the character is. Another metacharacter is the plus ("+") symbol which indicates that the character immediately to its left may be repeated one or more times. If the data being searched conforms to the rules of a particular regular expression, then the regular expression is said to match that string. For example, the regular expression "gauss" would match data containing gauss, gaussian, degauss, etc.

Software modules and libraries can similarly be written to search for regular expressions beyond the five network/transport layer parameters described above. In particular, some enterprises wish to identify network messages that are associated with applications that have not been assigned a well-known port number. Alternatively, an enterprise may be interested in identifying messages that are directed to a specific web page of a given web site. An enterprise may also wish to identify messages that are directed to or carry a particular uniform resource locator (URL). To identify such messages, an intermediate network device must examine more than just the five network/transport layer parameters described above. That is, the actual data portions of the message(s) must be parsed for specific patterns, such as selected URLs.

It is known to incorporate software modules or libraries that have been programmed to perform such search requests into servers. However, the evaluation of individual packets through software is an impractical solution for intermediate network devices, many of which receive and process far greater volumes of traffic than servers, due to the increasing size and complexity of modern networks. That is, today's computer networks can generate hundreds if not thousands of diverse traffic flows at any given time. The use of advanced network equipment, such as fiber optic transmission links and high-speed transmission protocols, such as "Gigabit" Ethernet, which is intended to support transmission speeds up to 1000 Mbps (i.e., 1 Gbps), further increase the speeds of these traffic flows. Furthermore, regardless of the processing power of the device's CPU (e.g., 16, 32 or even 64 bit), regular expression matching can only be performed 1 byte at a time, due to programming constraints.

Thus, the current software solutions for performing regular expression matching are becoming less efficient at performing their message processing tasks as transmission rates reach such high speeds. Accordingly, a need has arisen for performing regular expression matching at the high transmission speeds of current and future computer network equipment.

SUMMARY OF THE INVENTION

Briefly, the invention relates to a programmable pattern matching engine for efficiently parsing the contents of network messages for pre-defined regular expressions and for executing actions on messages that match those expressions. The pattern matching engine is preferably a logic circuit designed to perform its pattern matching and execution functions at high speed, e.g., at multi-gigabit per second rates. The pattern matching engine preferably includes, among other things, a regular expression storage device for storing the pre-defined regular expressions and the actions that are to be applied to messages matching those regular expressions, a message buffer for storing the current message being evaluated, and a decoder circuit for inputting the network message or portions thereof to, and for decoding and executing identified actions returned by the regular expression storage device. In a novel manner, the regular expression storage device includes one or more content-addressable memories (CAMs) that contain at least the pre-defined regular expressions. The corresponding actions may either be stored along with the regular expressions within the CAM or they may be stored within a second memory device, such as a random access memory (RAM), that is associated with the CAM. Association between the CAM and RAM is achieved by having each CAM entry identify and thus correspond to the specific RAM entry that contains the action to be applied to messages matching the regular expression contained in the respective CAM entry. The pattern matching engine, moreover, is configured such that the RAM provides its output to the decoder circuit, which decodes and executes the action contained therein.

In the illustrative embodiment, the pattern matching engine further includes a barrel shifter operating under the control of the decoder circuit and coupled to both the message buffer and the CAM. The barrel shifter essentially provides a moveable window for revealing a selected portion of the message currently stored in the message buffer. In operation, the decoder circuit operates the barrel shifter so as to input selected message portions to the CAM. The CAM compares each inputted message portion to all of its entries at the same time and identifies the first matching entry. The matching CAM entry identifies a corresponding RAM entry the contents of which are provided to the decoder circuit. The decoder circuit decodes the action returned by the RAM and applies that action to the message. The entries of the RAM, for example, may contain actions or instructions to continue searching the message, in which case the decoder circuit may direct the barrel shifter to input a new message portion to the CAM. The actions or instructions may alternatively direct the decoder to send the message to, e.g., a particular interface or port for forwarding or to a central processing unit (CPU) for additional processing. Other actions or instructions may cause the decoder to increment a counter, call and apply a particular subroutine, copy information regarding the message into a third memory device, etc. The programmable pattern matching engine of the present invention, including the CAM and its associated RAM, is preferably implemented through one or more integrated hardware components that efficiently interoperate so as to process network messages at high rates of speed, including multi-gigabit per second transmission rates.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
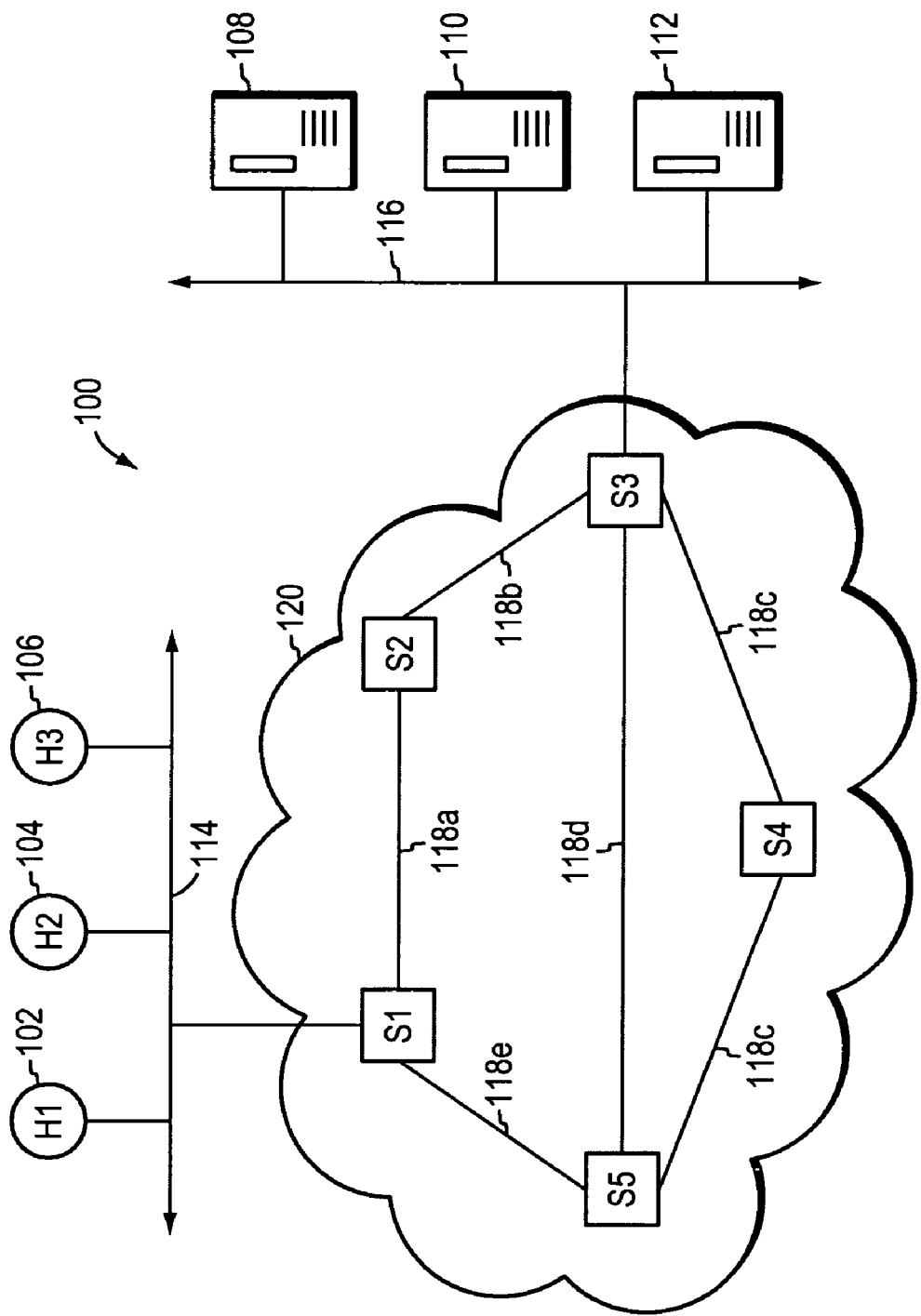
FIG. 1 is a highly schematic block diagram of a computer network.

FIG. 1 is a highly schematic block diagram of a computer network 100 comprising a plurality of stations that are attached to and thus interconnected by a network of communications media. The stations are typically computers, which may include hosts 102-106 (H1-H3), servers 108-112, and intermediate network devices, such as switches S1)-S5. Hosts H1-H3 may be personal computers or workstations. Each station of network 100 typically comprises a plurality of interconnected elements including a processor, a memory and a network adapter. The memory, moreover, may comprise storage locations addressable by the processor and the network adapter for storing software programs and data structures. The processor may comprise processing elements or logic for executing the software programs and manipulating the data structures. An operating system, typically resident in memory and executed by the processor, functionally organizes the station by invoking network operations in support of software processes executing on the station.

The communications media of network 100 preferably include one or more local area networks (LANs), such as LAN 114 to which hosts H1-H3 are attached, and LAN 116 to which servers 108-112 are attached. LANs 114 and 116 preferably support communication between attached stations by means of a LAN standard, such as the Token Ring or Ethernet LAN standards, which are defined by the Institute of Electrical and Electronics Engineers (IEEE) at IEEE standards 802.3 and 802.5, respectively.

Switches S1-S5 are preferably interconnected by a series of point-to-point links 118a-e and arranged as a network cloud 120, which interconnects the hosts H1-H3 on LAN 114 with the servers 108-112 on LAN 116. More specifically, switch S1 is attached to LAN 114 and switch S3 is attached to LAN 116. Thus, outside access to LAN 116, which may be considered a private network, must pass through one or more switches S1-S5 of network cloud 120. Servers 108-112 on LAN 116 are preferably configured to provide one or more services. For example, servers 108 and 110 may be configured as web-hosting servers, while server 112 may be configured as an electronic mail or database server.

Communication among the stations of network 100 is typically effected by generating and exchanging network messages between the communicating stations. That is, a source station may generate one or more discrete packets or segments in accordance with the higher layer protocols of a communications stack and encapsulate those packets or segments in one or more data frames whose format is defined by the LAN standard for the particular communications media to which the source station is attached.

In the preferred embodiment, these higher layer protocols correspond to the well-known Transmission Control Protocol/Internet Protocol (TCP/IP) Reference Model which is described in A. Tanenbaum *Computer Networks* (3rd ed. 1996) at pp. 35-38, among other places. Those skilled in the art will recognize that the present invention may work advantageously with other types of communication standards, such as the Internet Packet Exchange (IPX) protocol, etc.

A network manager responsible for servers 108-112 may wish to identify the particular types of traffic attempting to contact and obtain services from these servers so that appropriate treatments may be applied to that traffic. For example, the network administrator may wish to block outside access to certain web sites and/or web pages hosted by web server 108. Alternatively, the network manager may wish to identify attempts to contact specific web pages at servers 108 and 110 (e.g., electronic commerce pages) so that this traffic may receive higher priority within network cloud 120. The identity of such web pages may be specified by the particular uniform resource locators (URLs) contained in the network messages sent to web servers 108 and 110. Similarly, the network manager may wish to identify the particular application attempting to contact or connect to database server 112 so that traffic corresponding to mission-critical applications (e.g., processing customer invoices) can be given higher priority, while less important applications (e.g., bulk file transfers) can be given lower priority.

As described above, identifying such traffic flows was conventionally performed in software by servers or, in limited circumstances, by network devices. That is, a pattern matching software program would be written, typically in the Perl programming language, to search for a desired regular expression. Network messages received by an intermediate network device, such as a switch, would be passed to the processor which would execute the software program. The processor and memory architectures employed by most network devices often required that the network messages be evaluated one byte at a time. With the increases in transmission speeds through gigabit Ethernet and other high-speed communication standards and the longer network layer station addresses defined by IP version 6 (IPv6), software solutions for parsing network messages are becoming less efficient. As described below, the present invention is directed to a programmable pattern matching engine, preferably implemented as a logic circuit, that is designed to parse the contents of network messages for pre-defined regular expressions and to execute corresponding actions on those messages at high speeds, e.g., at multi-gigabit per second rates.

Figure 2:
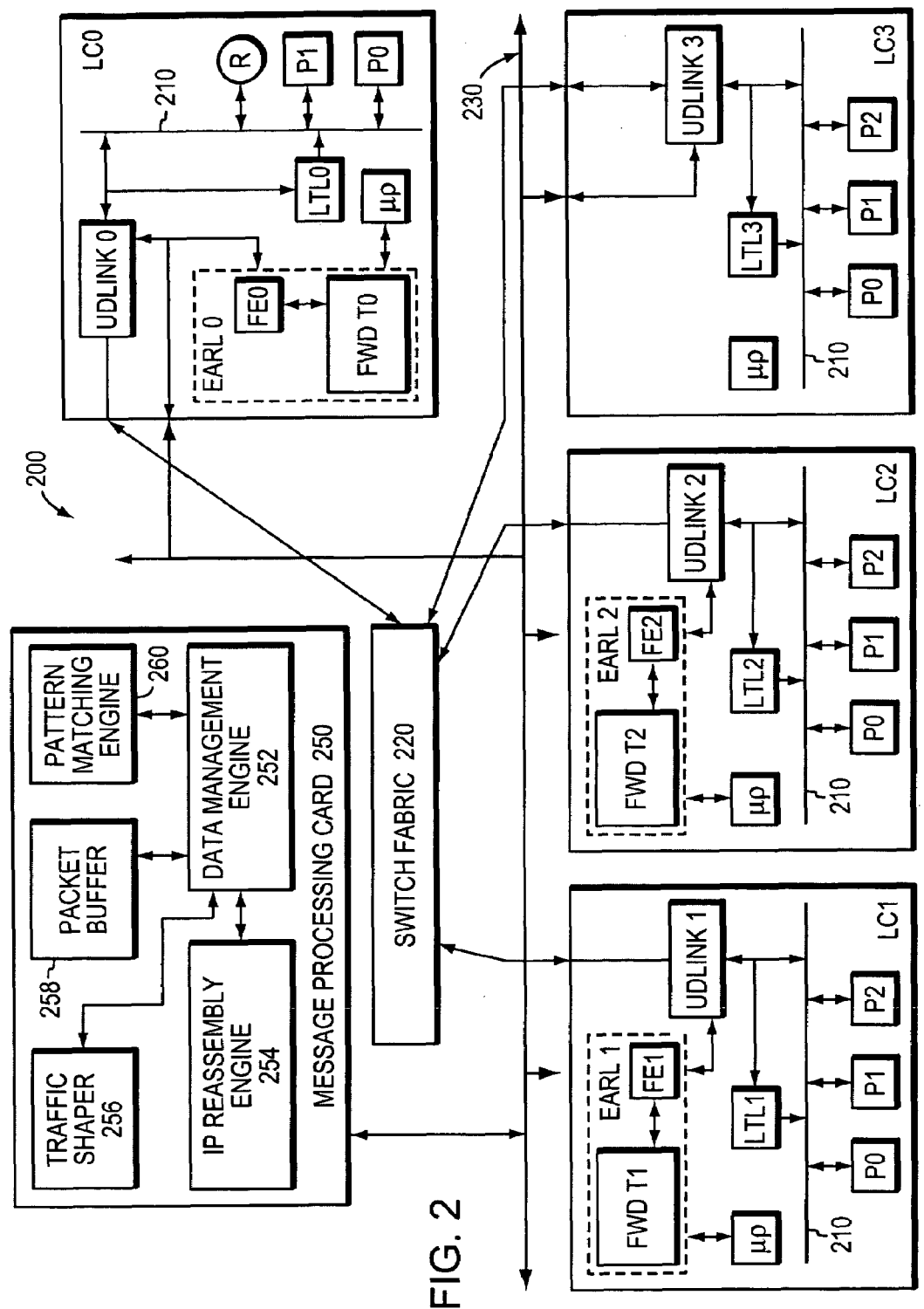
FIG. 2 is a partial functional block diagram of an intermediate network device including a pattern matching engine in accordance with the present invention.

FIG. 2 is a schematic, partial block diagram of switch S1, designated generally as switch 200. The switch S1 is preferably configured as a layer 4/7 switch having a software routing component and hardware components distributed among a plurality of line cards (LC0-3) that are interconnected by a switch fabric 220. One of the line cards, denoted LC0, is a switch management card (SMC) that includes an internal router (R) of the switch. The internal router may be embodied as a routing process executing in the internetwork layer (layer 3) or transport layer (layer 4) of a conventional protocol stack.

Each line card comprises a plurality of ports P (e.g., P0-P2), a local target logic (LTL) memory and an up/down link (UDlink) interface circuit interconnected by a local bus 210. Each line card further contains a microprocessor (μp) in communicating relation with all of its "peer" microprocessors in switch 200 over a management bus (not shown). Some of the line cards may comprise self-contained "mini-switches" that are capable of rendering forwarding decision operations for data frame traffic switched by the fabric 320; that is, forwarding decisions implemented by the switch fabric may be provided by some line cards. Each of these cards includes an encoded address recognition logic (EARL) circuit coupled to the UDlink and microprocessor. The EARL executes all forwarding decisions for its associated line card(s), while the LTL implements those forwarding decisions by selecting ports as destinations for receiving data (in the form of frames or packets) transferred over the local bus. To that end, the EARL contains forwarding engine circuitry (FE) and at least one forwarding table (FwdT) configured to produce a unique destination port index value.

The switch fabric 220 is preferably a switching matrix employed to control the transfer of data among the line cards of the switch 200. The UDlink provides an interface between the local bus 210 on each line card and the switch fabric 220. Inputs to the LTL logic are received over the local bus 210, which is driven by the UDlink. By employing the UDlink in this manner, a line card (e.g., LC0-2) may include both an EARL circuit and a UDlink or it may share the EARL contained on another line card. In this latter case, a common bus 230 enables a line card without a forwarding engine (e.g., LC3) to use the forwarding engine (e.g., EARL 0) on another line card, such as the SMC. For those line cards without a forwarding engine, the UDlink also provides a connection to the common bus 230.

The format of data between each line card and the switch fabric is generally similar to that employed over the local bus. For example, the format of data transferred from each line card to the switch fabric (hereinafter referred to as a "fabric frame") includes bit mask information instructing the switch fabric 220 where to forward the frame and other information, such as cost of service (COS) information, used by the switch. This information, which is also included on fabric frames traversing the local bus 20, is embedded within a header of each frame.

Suitable intermediate network device platforms for use with the present invention include the commercially available Catalyst 5000 and 6000 series of switches from Cisco Systems, Inc., along with the intermediate network device disclosed in copending and commonly assigned U.S. patent application Ser. No. 09/469,062, now issued as U.S. Pat. No. 6,735,198, titled, *Method and Apparatus for Updating and*

*Synchronizing Forwarding Tables in a Distributed Network Switch* by Thomas J. Edsall et al.

The layer 4/7 switch S1 (200) preferably functions as a border gateway to private LAN 116 (FIG. 1). In addition, switch S1) may function as a firewall and a load balancer that analyzes higher layer headers (e.g., layer 4 header) and data (e.g., layer 7 application data) of network messages received at the switch 200. In the former case, a firewall engine of switch S1 analyzes the network messages to counter attacks by potential intruders/hackers, whereas in the latter case, a load balancer function analyzes the messages to identify one or more regular expression, and to direct matching messages to an appropriate server 108-112. Typically, a switch that is configured to perform such higher layer functions implements the regular expression matching processing in software, such as one or more software modules or libraries written in the Perl programming language. As described above, however, such software-based processing can be inefficient and may result in a bottleneck within the switch. The present invention provides a fast packet parsing and pattern matching engine for use in an intermediate network device, such as switch S1, to efficiently perform packet analysis and flow treatment functions. In particular, the engine can parse extension headers (e.g., Ipv6 extension headers) and textual messages (e.g., HTML headers), rapidly match regular expressions, and pass relevant fields (e.g., URLs) to other switch components.

To these ends, the common bus 230 of switch 200 further enables the line cards LC0-LC3 to interact with a high-speed message processing card 250 by exchanging data over the bus 230. Message processing card 250 preferably includes, inter alia, a data management engine 252, an IP re-assembly engine 254, a traffic shaper 256, a packet buffer 258, and a pattern matching engine 260. The traffic shaper 256, IP re-assembly engine 254, packet buffer 258 and pattern matching engine 260 are each coupled to the data management engine 252, and control information may be exchanged with engine 260 and the other components of switch 200 through a plurality of predefined type-length-value (TLV) messages.

Figure 3:
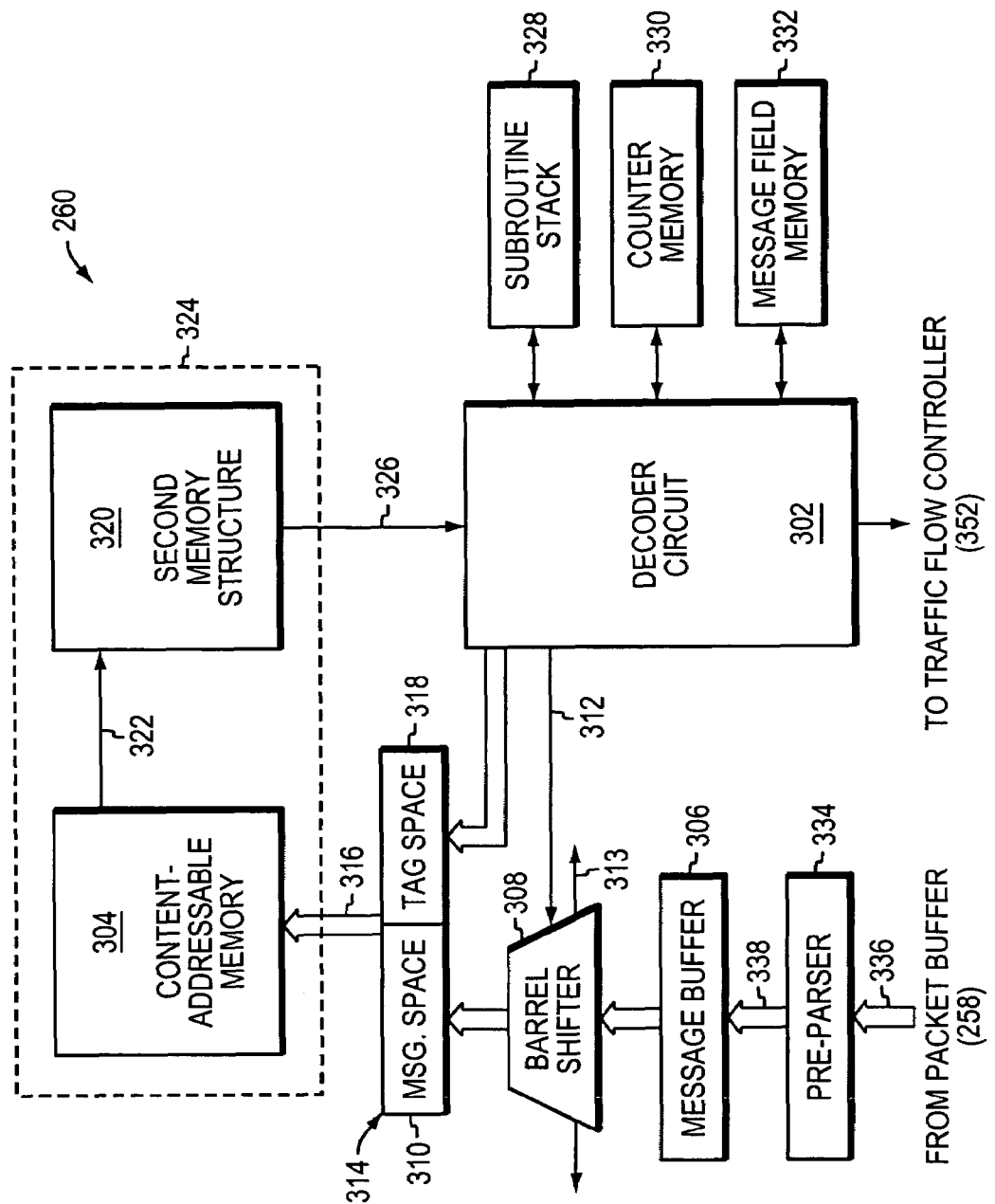
FIG. 3 is a highly schematic block diagram of the pattern matching engine of FIG. 2.

FIG. 3 is a highly schematic block diagram of the pattern matching engine 260 of switch 200 (S1) of FIG. 2. The pattern matching engine 260 preferably includes a decoder circuit 302 for decoding and executing message-related instructions, and a regular expression storage device 324 having a content-addressable memory (CAM) 304 that can be programmed, as described below, to store at least the regular expression patterns used in searching network messages. The pattern matching engine 260 further includes a message buffer 306 for storing a network message to be evaluated, and a barrel shifter 308 that is connected to the message buffer 306 and operatively controlled by the decoder circuit 302 as illustrated by control arrow 312. The barrel shifter 308 is configured to reveal a selected segment or portion of the message stored in buffer 306 as directed by the decoder circuit 302. Decoder circuit 302 essentially "slides" the barrel shifter 306 along the message buffer 306 as illustrated by double arrow 313 so as to reveal the selected window. The barrel shifter 308 is further coupled to the CAM 304 so as to load the retrieved message portion into a message space 310 of a CAM input 314 that, in turn, is inputted to the CAM 304 as indicated by arrow 316. The CAM input 314 further includes a tag space 318 that is loaded with a tag value as described below by the decoder circuit 302.

In the illustrative embodiment, the regular expression storage device 324 further includes a second memory structure or device 320, such as a random access memory (RAM), that is associated with CAM 304 and programmed, as described below, to contain the actions or treatments that are to be applied to network messages matching the regular expressions contained within the CAM 304. In particular, both the CAM 304 and the RAM 320 include a plurality of respective entries or rows. Each entry or row of the CAM 304, moreover, includes a pointer that particularly identifies a corresponding entry (i.e., a location) of the RAM 320 as indicated by arrow 322. That is, there is a one-to-one correspondence between CAM entries and RAM entries. The RAM 320, moreover, is configured to provide an output (i.e., the contents of the row or entry identified by the matching CAM entry) to the decoder circuit 302 as indicated by arrow 326. The combination of the CAM 304 and RAM 320 forms the preferred high-speed regular expression storage device 324 of the present invention. To improve performance, pattern matching engine 260 preferably includes multiple (e.g., ten) instances of decoder circuits, message buffers, etc. each processing a different message and each configured to submit inputs to and receive outputs from the CAM 304 and RAM 320. This arrangement allows messages to be processed in pipeline fashion reducing overall message processing time.

The decoder circuit 302 may be further coupled and thus have access to a subroutine stack 328, a counter memory 330 and a message field memory 332. Depending on the action identified by the output from RAM 320, the decoder circuit 302 may interoperate with and thus utilize the facilities offered by one or more of the subroutine stack 328, the counter memory 330 and the message field memory 332. Engine 260 may also include a pre-parser 334 which receives as an input the network message from packet buffer 258 (FIG. 2) as indicated by arrow 336. The pre-parser 334 is preferably a logic circuit that is configured and arranged to extract one or more commonly evaluated fields from the network message in order to speed up the operations of the pattern matching engine 260. The pre-parser 334 preferably prepends these extracted fields to the network message and passes the combination (i.e., network message and appended fields) to the message buffer 306 for storage therein as indicated by arrow 338.

The CAM 304 is preferably a ternary content addressable memory (TCAM) so that the cells (not shown) of each entry or row may be associated with or assigned one of three possible values, "0", "1" or "don't care". A preferred TCAM has 512K rows of 288 bit length each. To implement the "don't care" value, the TCAM 406 may be segregated into blocks of cells (each cell being either asserted or de-asserted) and a corresponding mask applied to determine whether the particular cells of its block are "care" or "don't care". The TCAM 406 and RAM 320 may be static or dynamic.

Those skilled in the art will recognize that other combinations of hardware components in addition to those specifically described herein may be advantageously utilized to achieve the objectives of the present invention. For example, if TCAMs of sufficient width were reasonably or commercially available, then the associated RAM 320 might be rendered unnecessary. That is, a sufficiently wide TCAM could store both the regular expressions and the corresponding actions or treatments. In that case, the regular expression storage device 324 would simply comprise one or more large TCAMs whose output (i.e., the matching action) would be provided directly to the decoder circuit 302.

The pattern matching engine 260 is preferably formed from one or more Application Specific Integrated Circuits (ASICs) or Field Programmable Gate Arrays (FPGAs). Suitable TCAMs for use with the present invention are commercially available from NetLogic Microsystems, Inc. of Mountain View, Calif. and Music Semiconductors of Hackettstown, N.J. RAM 320 may be programmed through one or more conventional write operations, while the TCAM 304 may be programmed through a dedicated port (e.g., a Parallel Input/Output port) (not shown). It should be understood that some high-level software may be utilized to generate the data or information used to program the TCAM 304 and RAM 320.

Operation of the pattern matching engine 260 of the present invention preferably proceeds as follows. Suppose host H1 (FIG. 1) at LAN 114 generates one or more network messages for contacting a website hosted at server 108 at LAN 116. The network communications facilities at host H1 encapsulates the network message into one or more TCP segments and passes it down the communications stack for transmission on LAN 114. In particular the TCP segment is encapsulated into one or more IP packets and the IP packets, in turn, are encapsulated into one or more Ethernet frames which may be driven onto LAN 114 by host H1. Assuming port P2 (FIG. 2) of line card LC3 is attached to LAN 114, then these frames are received at LC3. LC3 transfers the frames to its UDLINK 3 via local bus 210 in a conventional manner, and the UDLINK 3 drives them onto common bus 230. The frames are received at the other line cards (i.e., LC0-LC2) and also at the message processing card 250. Assuming forwarding engine FE 1 at line card LC1 concludes that the frames should be processed by the message processing card 250, the line cards LC0-LC2 simply discard them. At the message processing card 250, the frames are handed to the IP reassembly engine 254 which, in turn, recovers the corresponding network message (i.e., the IP packet and/or the TCP segment) from the plurality of Ethernet frames and stores the message in the packet buffer 258.

The pattern matching engine 260 retrieves the network message from the packet buffer 258 and provides it to pre-parser 334 (FIG. 3) via arrow 336. The pre-parser 334 scans the message and pulls out commonly evaluated fields. For example, the pre-parser 334 may pull out the following information: IP source address, IP destination address, TCP/UDP source port, TCP/UDP destination port, transport layer protocol type (typically TCP or UDP), IP type of service (TOS), virtual LAN (VLAN) identifier (to the extent the message is associated with a VLAN), TCP acknowledgement (ACK) flag, TCP synchronize (SYN) flag, TCP end-of-transmission (FIN) flag, TCP reset (RST) flag, an index to the port at which the message was received (e.g., port P2 of line card LC3), TCP/UDP padding (if any), and the underlying layer 2 (i.e., Ethernet) frame.

This information (i.e., the commonly evaluated fields and the layer 2 frame) are then stored in the message buffer 306 by the pre-parser 334 via arrow 338. The contents of the message buffer 306 then undergo one or more look-ups into the CAM 304 under the control of the decoder circuit 302. Specifically, the decoder circuit 302 directs the barrel shifter 308 to reveal and load a selected segment or portion of the contents of the message buffer 306 and place it in the message portion space 310 of CAM input 314. In the illustrated embodiment, the barrel shifter 308 is configured to reveal and load 32 byte segments and to slide along the message buffer in 1 byte increments. The decoder circuit 302 selects the desired 32 byte segment from message buffer 306 by providing the barrel shifter 308 with an offset value via command line 312. An offset of 0, for example, results in bytes 0-31 being loaded into message portion space 310 of CAM input 314, whereas an offset of "1" results in bytes 1-32 being loaded and an offset of "2" would result in bytes 2-33 being loaded, etc.

Initially, the decoder circuit 302 provides an offset of 0 to the barrel shifter 308 resulting in bytes 0-31 from the message buffer 306 being loaded into the message portion space 310 of CAM input 314. The decoder circuit 302 is also programmed to load an initial tag value into the tag space 318 of CAM input 314.

For TCP/IP traffic, all TCP/UDP segments corresponding to the same stream, as identified by the contents of their Ethernet and IP headers, are passed to the pattern matching engine 260 for parsing. When the end of the current segment being evaluated is reached, the pattern matching engine 260 preferably saves the current state so that it may be reloaded when the next segment is received.

Figure 4:
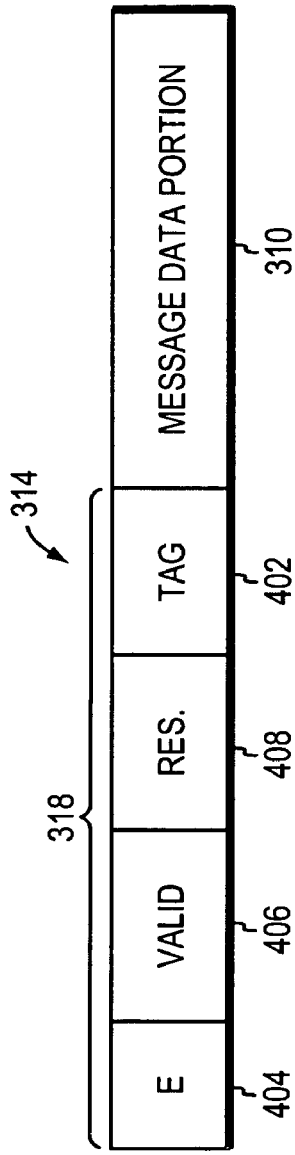
FIGS. 4 and 5 are representative data structures for use with the pattern matching engine of the present invention.

FIG. 4 is a block diagram of the CAM input 314, which generally includes a tag space 318 and a message data space 310. The tag space 318 includes a tag field 402 that contains the tag value used by the decoder circuit 302 in selecting a desired "logical" CAM within CAM 304, thereby extending the capabilities and improving the performance of the pattern matching engine 260. The tag space 318 also includes other fields that are similarly loaded by the decoder circuit 302. In particular, the tag space 318 includes an end (E) flag 404 that is asserted by the decoder circuit 302 when the message space 310 contains the last 32 byte section of information from the message buffer 306, otherwise the decoder circuit 302 leaves the E flag 404 de-asserted. A valid field 406 indicates the number of bytes in the message space 310 that are valid. A reserved (RES.) field 408 is presently unused.

Once the CAM input 314 is loaded, it is provided to the CAM 304 as indicated by arrow 316. CAM 304, in a conventional manner, compares the CAM input 314 with each of its entries all at the same time and identifies the first entry matching the input 314. As described above, each entry of the CAM 304 identifies and thus corresponds to an associated entry in RAM 320 that contains the action or treatment to be applied to the message matching the respective CAM entry. Thus, assuming there is a matching entry for this CAM input 314, the matching entry identifies a corresponding location in RAM 320 as indicated by arrow 322. In response, RAM 320 provides the contents of this location to the decoder circuit 302 as indicated by arrow 326.

Figure 5:
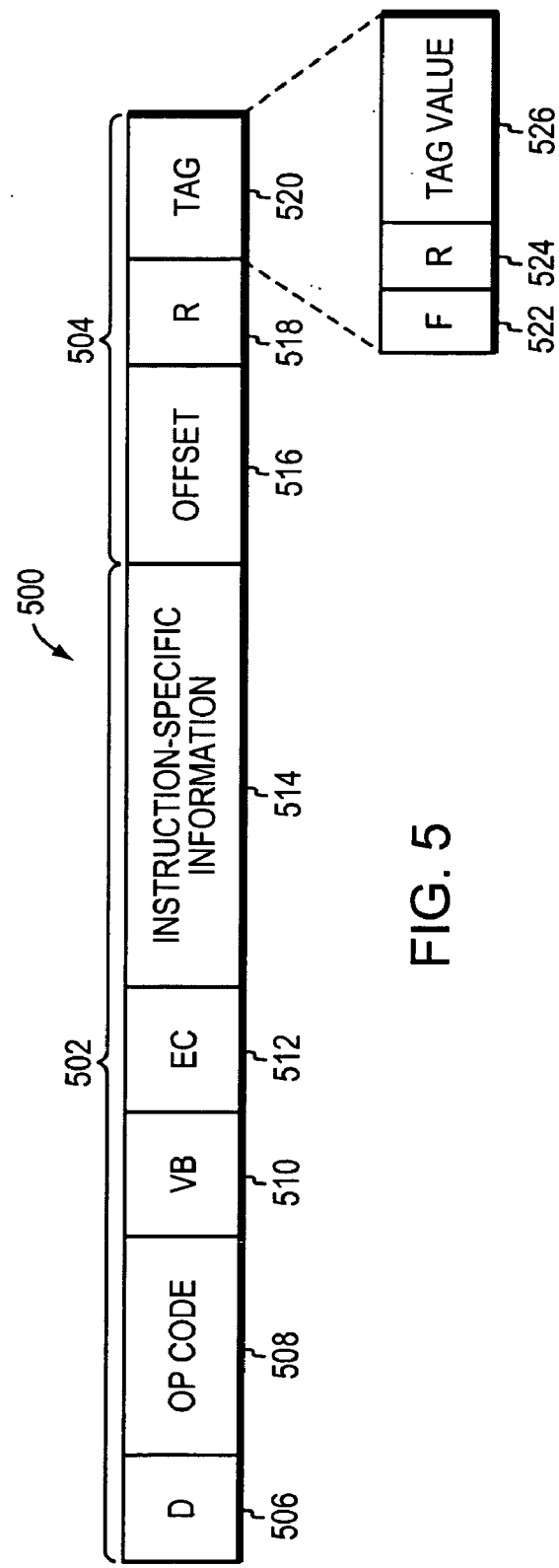

FIG. 5 is a block diagram of the preferred format of an output 500 from RAM 320 (FIG. 3), e.g., the identified row or entry of the RAM 320 as provided to the decoder circuit 302. RAM output 500 has two parts; a first part 502 that pertains to the current TCAM look-up, and a second part 504 that pertains to the next TCAM look-up, if any. The first part 502 preferably includes a one-bit done (D) flag 506, which indicates that the message being evaluated requires no further processing by engine 260, a six-bit operation code (op code) field 508 that specifies the particular action to be taken or the treatment to be applied to this message, a six-bit valid byte (VB) field 510, a one-bit end check (EC) field 512, and a 65-bit instruction-specific data area 514 that contains data for executing the action or treatment specified by the op code of field 508. The second part 504 may similarly be configured to have a plurality of fields. For example, second area 504 may include an eight-bit off-set field 516 and an associated one-bit relative (R) flag 518, which the decoder circuit 302 uses to slide the barrel shifter 308 along the message buffer 306 and thus input a new portion of the message to the TCAM 304. Second area 504 may further include a tag field 520, which itself may be divided into a presently un-used one-bit flag (F) field 522, a second one-bit relative (R) flag 524 that is associated with an eighteen-bit tag value field 526.

It should be understood that areas 502 and 504 may include additional or other fields. For example, the second area 504 may also include a look-up source field, which may be used to designate some other source besides the message buffer 306 for the next TCAM look-up. Other such sources may include control (e.g., TLV) information, other, non-message related, data received by the engine 260 or output data from the RAM 320.

Those skilled in the art will recognize that various op codes may be defined in order to carry out any number of desired actions or treatments. In the preferred embodiment, the following op codes are defined and utilized.

CONT

A first action is to continue searching the current message stored at message buffer 306. Here, the done flag 506 is de-asserted, indicating that the decoder circuit 302 is to continue processing the message, and the op code 508 is set to a pre-selected value (e.g., "0") which the decoder circuit 302 is programmed to recognize as the continue action. The offset field 516 contains the specific offset (e.g., in bytes) that the decoder circuit 302 is to employ in sliding the barrel 308 shifter along the message buffer 306 so as to retrieve the next message segment. The first R flag 518 indicates whether the offset from field 516 is relative (e.g., the flag is asserted) or absolute (e.g., the flag is de-asserted). A relative offset means that the decoder circuit 302 simply slides the barrel shifter 308 from its current position by whatever value is contained in the offset field 516 (e.g., 3 bytes). An absolute offset is independent of the barrel shifter's current position end means that the decoder circuit 302 is to slide the barrel shifter 308 along buffer 306 so that it is located a specific distance into the message. For example, if the first R flag 518 were de-asserted and the associated offset field 516 contained the value "3", then the decoder circuit 302 would move the barrel shifter 308 so that the respective window defined by barrel shifter 308 started at the third byte of the message within buffer 306.

For a continue action, the tag value field 526 preferably contains the tag to be inserted in the tag space 318 of the next CAM input 314 by the decoder circuit 302. If the second R flag 524 is asserted (relative mode), then the decoder circuit 302 adds the value contained in the tag value field 526 to the tag value of the previous CAM input 314 in order to obtain a new tag for the next CAM input 314. If the second R flag is de-asserted (absolute mode), then decoder circuit 302 simply copies the contents of the tag value 526 into to the tag space 318 of the next CAM input 314. In sum, the continue action, directs the decoder circuit 302 to formulate a new CAM input 314 with a new message segment and possibly a new tag. The continue action is typically used when a long regular expression is broken up into multiple CAM entries (e.g., searching for IPv6 addresses).

SEND

Engine 260 supports one or more send actions for use in forwarding matching messages. A send action may be used upon matching the last portion of an IPv6 address in order to send the respective message to a particular interface or port for forwarding. In the preferred embodiment, there are two types of send actions: a network (NTWK) send and a CPU send. A network send means the message is sent to a given port or interface for forwarding. A CPU send means the message is sent to a processor for additional processing. The particular CPU may be a main CPU (not shown) at the switch 200 or it may be one of the microprocessors (μp) at a particular line card LC0-LC3.

For a NTWK send, the done flag 506 is asserted indicating that engine 260 is done processing the message, and the op code 508 is set to a pre-selected value (e.g., "1") which the decoder circuit 302 is programmed to recognize as a NTWK send action. The instruction-specific information area 514 includes a re-write pointer sub-field and a shaper identifier (SID) sub-field. The re-write pointer identifies a particular re-write rule that may be used by the respective EARL in re-writing the message before it is forwarded. The re-write rule, for example, may direct the EARL to re-write the message so as to be compatible with a different layer 2 standard (e.g., Token Ring). The pattern matching engine 260 preferably forwards the message along with the specified re-write rule to the appropriate EARL for implementing the network send action. The message is also shaped by traffic shaper in accordance with the returned SID.

For a CPU send, the done flag 506 is similarly asserted. The op code 508 is set to another pre-selected value (e.g., "2") which the decoder circuit 302 recognizes as a CPU send action. The instruction-specific information area 514 includes a program pointer sub-field which identifies a program or process located in the CPU's associated memory. The message and program identifier are then forwarded to the CPU, which executes the identified program and takes the resulting action. A CPU send action may be used, for example, to perform stateful inspections of messages that have been identified by engine 260 as belonging to the H.225 protocol. The H.225 protocol governs the control session for setting up a real-time multimedia session in a packet-based network in accordance with the well-known H.323 protocol from the International Telecommunications Union (ITU). The CPU may process the message and learn the parameters (e.g., TCP source and destination ports, etc.) of the up-coming multimedia session, and, in response, insert new entries in the CAM 304 in order to match the subsequent H.323 messages.

CNT

A counter action is used to increment one or more counters maintained at the counter memory 330 (FIG. 3). Here, the D flag 506 may be asserted or de-asserted depending on whether or not additional processing will take place, and the op code 508 may be set to "3". The instruction-specific information space 514 includes a counter number sub-field and a value sub-field. The counter number identifies a particular counter within counter memory 330 and the value specifies the amount by which the identified counter should be incremented (or decremented). The decoder circuit 302 preferably uses a pre-defined command or action to carry out the counter action. The counter action (CNT) is typically used to record traffic flow statistics. For example, counters may be established and up-dated to record the amount of traffic accesses the various services provided by servers 108-112 (FIG. 1).

If the D flag of the CNT action is de-asserted, then the decoder circuit 302 also causes a new CAM input 314 to be generated by directing the barrel shifter 308 to load a new message segment into message space 310 in accordance with the values in the first R flag 518 and offset field 516. The decoder circuit 302 loads a new value into the tag space 318 of this new CAM input 314 as specified by the values in the second R flag 524 and the tag value field 526 of the CNT action.

CALL

A call action, in combination with a return (RET) action, as described below, is used by engine 260 to implement a particular subroutine. Subroutines are preferably used to perform pattern matching tasks that are repeatedly encountered, such as skipping over white or blank spaces in messages, skipping over "//" in URLs, etc. For example, upon matching some preliminary regular expression, it may be that the following portion of the message, which may be of variable length, contains white spaces or blanks. In order to skip over these white spaces or blanks and resume searching on the next piece of data within the message, engine 260 uses a subroutine. First, upon matching the portion of the message at which the white spaces or blank portion begins, the corresponding action returned by RAM 320 is a CALL. The CALL action has the D flag is de-asserted indicating that processing of the respective message is not yet complete. The op code may be set to "4" to reflect a CALL action. The instruction-specific information space 514 preferably contains a return tag field, that specifies the tag to be used by the decoder circuit 302 after executing the desired subroutine, and a subroutine tag field that specifies the logical CAM within CAM 304 that has been configured to execute the selected subroutine (e.g., skipping over blank spaces). The return tag is preferably pushed onto the subroutine stack 328 by the decoder circuit 302, and the subroutine tag is used by the decoder circuit 302 to load the tag space 318 of the next CAM input 314. The decoder circuit 302 similarly utilizes the offset 516 of the CALL action to direct the barrel shifter 308 to retrieve the appropriate segment (i.e., window) of the message and load it into the message space 310 of the next CAM input 314. The corresponding entries of the selected logical CAM are programmed to execute the desired subroutine (e.g., skip over the white spaces or blanks). It should be understood that while the pattern matching engine 260 is working through the subroutine, one or more CONT actions may be executed (i.e., the subroutine itself may include one or more CONT instructions). The action specified by the last matching CAM entry for the subroutine is preferably a return (RET) action.

RET

With the RET action, the D flag is preferably de-asserted indicating that processing of the respective message is not yet complete. The op code may be set to "5" to reflect a RET action. In response to the RET action, the decoder circuit 302 "pops" the return tag value from the top of the subroutine stack memory 328. The decoder circuit 302 then uses this return tag, along with the offset 516 specified in the RET action to generate a new CAM input 314 so as to continue processing the message. For example, after locating last white space, the RET action may contain a value in the offset field 516 that identifies where in the message data resumes. The decoder circuit 302 can then use this offset to slide the barrel shifter 308 directly to this point and resume searching from that point forward.

MARK

A mark action is typically used in combination with a memory copy action to store particular locations in a message at which significant data is found. The mark action preferably has the D flag 506 de-asserted, has an op code of "6" and includes an offset adjustment sub-field within the instruction-specific information space 514. The offset adjustment sub-field is used to identify the position to be marked, which may be different from the regular expression being searched. In response to the mark action, the decoder circuit 302 preferably adds the value contained in the offset adjustment sub-field to the current offset value (i.e., the offset used to place the barrel shifter 308 in its current position) and stores the result in an internal register (not shown). This internal register is then typically read in response to a memory copy action, described below, in order to copy a section of the message from the marked position to the position that is matched by the memory copy action.

Since the D flag 506 is not asserted, the decoder circuit 302 also continues searching the message. That is, decoder circuit 302 formulates a new CAM input 314 by directing the barrel shifter 308 to load a new message segment into message space 310 in accordance with the values in the first R flag 518 and offset field 516 of the MARK action, and loads a new value into the tag space 318 in accordance with the values in the second R flag 524 and the tag value field 526 of the MARK action.

MEMCPY

A memory copy (MEMCPY) action is preferably used to store a field descriptor in the message field memory 332. The MEMCPY action preferably has the D flag 506 de-asserted, has an op code of "7" and includes sub-fields for offset adjustment, field name and descriptor index within the instruction-specific information space 514. In response to the MEMCPY action, the decoder circuit 302 preferably enters an array in the message field memory 332. The decoder circuit 302 preferably copies the value from its internal register (generated in response to the MARK action as described above) into the array, which represents a start field pointer. It also adds the offset adjustment contained in the MEMCPY action to the current offset and stores this result in the array as well, which represents an end field pointer. Decoder circuit 302 also stores the field name and descriptor index as specified by the MEMCPY action in the array. The decoder circuit 302 may also generate a length for the array and similarly store this value.

OFS

An offset (OFS) action is used by the decoder circuit 302 to skip over segments of the message that have variable lengths (e.g., the options areas of IP packets and/or TCP/UDP segments). Basically, the decoder circuit 302 uses information contained with the OFS action to compute a new offset for directing the barrel shifter 308 to a new location along the message buffer 306. The OFS action preferably has the D flag 506 de-asserted, an op code of "8" and an offset position (OP) field in place of the offset field 516. Within the instruction-specific information space 514, the OFS action includes sub-fields for offset length (OL), offset granularity (OG) and an offset constant (OC). The decoder circuit 302 computes the new offset from this information as follows. The OL sub-field specifies the length of the OP field (e.g., 4, 8, 16 or 32 bits). The value of the OP field may be specified in units of bytes, 16-bit words, 32-bit words or 64-bit words. The OG sub-field converts the value from the OP field into bits. The OC is used to account for situations in which the variable length field does not immediately follows the offset field. Thus, the offset is computed by the decoder circuit 302 as follows:

OP*OG+OC

Other Actions

It should be understood that additional or other actions may be defined and stored within the RAM 320. For example, an action that un-binds a TCP session (UBND) could be defined. In response to this action, the decoder circuit 302 would direct the CPU or other component responsible for the subject TCP session to break it. Alternatively, an action for populating the fields of a traffic flow table (FTBL) could be defined and stored within RAM 320. In response to the FTBL action, the decoder circuit 302 might specify a particular treatment to be applied to a given traffic flow and cause that treatment to be stored in a table, thereby avoiding the need to process future messages corresponding to this flow in the pattern matching engine 260.

Other possible actions include a generate TLV action, which causes the engine 260 to generate a particular TLV message for some other switch component. A compare action causes the decoder circuit 302 to perform some comparison (e.g., a comparison against a value in a specified register).

The VB and EC fields 510, 512 of the RAM output 500 (FIG. 5) are preferably used to perform efficient, partial look-ups within TCAM 304, and to correctly identify the end of strings. For example, the value of the VB is preferably set to the minimum number of valid bytes (i.e., not padding) inserted into the message data portion 310 of the current TCAM input 314 or look-up in order to treat a match as a "true" hit. For example, if the message data portion 310 of the current TCAM look-up contains 22 bytes of valid data (the rest being padding) and the number of valid bytes from the VB field 510 of the matching RAM output 500 is 20, then decoder circuit 302 knows it has a "true" hit and proceeds to execute the action specified by the corresponding op code from field 508. If the number of valid bytes of the current TCAM input 314 or look-up was less than 22 bytes, then the decoder circuit 302 looks to see if the EC field 512 is asserted. If the EC bit is not asserted, the decoder circuit 302 simply saves the values from the offset 516, relative 518 and tag 520 fields and waits to receive additional data (e.g., another TCP/UDP segment). When the new data (e.g., segment) is received, the decoder circuit 302 retrieves the offset, relative and tag values and uses them to generate the next TCAM input 314.

If the number of valid bytes of the current TCAM input 314 is less than the value specified in the VB field 510 and the EC field 512 is asserted, then the decoder circuit 302 first saves the tag and offset from the current TCAM input 314 as well as the new op code, tag and offset from the RAM output 500. It then performs another look-up in the TCAM 304 using the same data from the message data portion 310 of the current TCAM look-up, but using a new subroutine tag in order to search the contents of the message data portion 310 for an end delimiter. The particular subroutine tag may be specified in a separate field, e.g., a subroutine tag index (STI) field (not shown), in the RAM output 500. If a match is found (i.e., the end delimiter is located), a return (RET) action is preferably specified in the op code field 508 of the matching RAM output 500. In response to the RET action, the decoder circuit 302 retrieves the previously stored op code, tag and offset values from the prior RAM output 500 and executes the action specified by that op code. If a match is not found, then the decoder circuit 302 simply waits for the receipt of more data (e.g., another TCP/UDP segment) and uses the previously saved offset, relative and tag values from the last RAM output 500 in order to generate the next TCAM input 314.

As shown, the pattern matching engine 260 of the present invention can parse network messages at high speeds (e.g., multi-Gigabit rates). By selectively programming the CAM entries of the storage device 324, engine 260 can search for regular expressions occurring anywhere within the selected network messages, including both the header (e.g., TCP, IP, and/or data link headers) and the payload (e.g., the data portion) and take responsive actions. A switch incorporating the pattern matching engine 260 can thus make forwarding decisions based on selected parameters or criteria from layer 2 (i.e., the data link layer) through layer 7 (i.e., the application layer).

A Pattern Matching Example Suppose that a network administrator wishes to identify network messages that begin with the string "123456" and to re-write and forward such messages in accordance with some pre-defined re-write rule (e.g., rule 35). Suppose further that the network administrator also wishes to identify messages having a "55" before a "65" anywhere within the message, and to execute some pre-defined software routine (e.g., program number 2) on such messages. Finally, for all messages which do not satisfy either of these two requirements, suppose that the network manager wishes to execute another pre-defined software routine (e.g., program number 1) on such messages.

Figure 6:
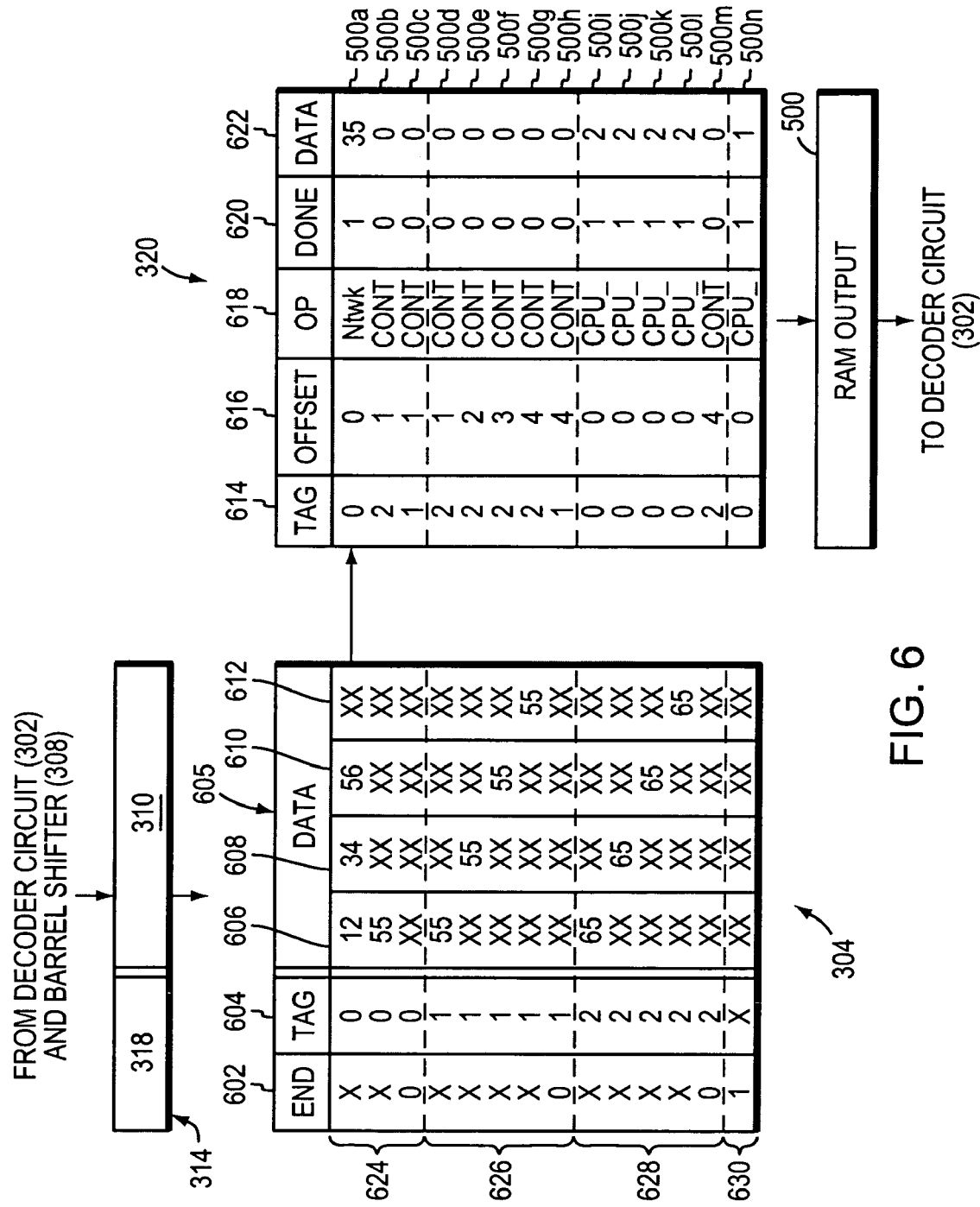
FIGS. 6 and 7 are highly schematic, partial representations of the memory structures of the pattern matching engine.

FIG. 6 is a highly schematic representation of CAM 304 and RAM 320 whose entries have been programmed to carry out the above-defined actions. Both CAM 304 and RAM 320 have a plurality of corresponding entries or rows which are organized into a plurality of fields by means of a number of common columns. CAM 304, for example, includes an end column 602 for matching against the end flag 404 (FIG. 4) of CAM inputs 314, a tag column 604 for matching against the tag field 402 of CAM inputs 314 and a series of data columns 606-612 for matching against the information contained in the message data space 310 of CAM inputs 314. RAM 320 similarly includes a tag column 614 for storing the tag portion 520 of RAM outputs 500, an offset column 616 for storing the offsets 516 of RAM outputs 500, an op code column 618 for storing the op codes 508 of RAM outputs 500, a done column 620 for storing the done flag 506 of RAM outputs 500, and a column 622 for storing the instruction-specific information of RAM outputs 500. By virtue of the values stored in the entries of the tag column 604 (i.e., 0-2, and "X" for don't care), CAM 304, which is a ternary content addressable memory, may be considered to include four "logical" CAMs 624-630.

When a message is first received and stored in message buffer 306 (FIG. 3), the decoder circuit 302 preferably provides the barrel shifter 308 with an offset of "0", thereby causing the barrel shifter 308 to load the first M bytes of the message into message space 310 of CAM input 314, where M corresponds to the width or window of the barrel shifter 308. The decoder circuit 302 also loads an initial value (e.g., "0") into the tag space 318 of the CAM input 314 and applies this input to CAM 304. Only the first logical CAM 624 has tag values of "0", however, and thus this CAM input can only match against the three entries corresponding to logical CAM 624. If the message data space 310 of this CAM input 314 starts with the string "123456", then it will match the first row of the CAM 304, causing the corresponding row 500a of RAM 320 to be returned to the decoder circuit 302. As provided in the field corresponding to column 618, the op code of this RAM output 500a is "NTWK", which the decoder circuit 302 recognizes as an instruction to forward the message. From column 622, RAM output 500a also includes the value "35" in its instruction-specific information field 514, which the decoder passes along to the EARL for implementing re-write rule 35. Since the pattern matching engine 260 is finished with this message, the done flag 506 from column 620 of RAM output 500a is asserted, thereby confirming that processing is complete.

If the message did not begin with the string "123456", then the second row or entry of the first logical CAM 624 tests whether the message starts with a "55". If so, there is a match and the decoder circuit 302 receives the corresponding row 500b of RAM 320 as a RAM output 500. From column 618, the op code for this RAM output 500b is CONT. In response, the decoder circuit 302 moves the barrel shifter 308 by the offset specified from column 616 (e.g., "1"), thereby causing the barrel shifter 308 to slide one byte along the message and load the corresponding window into the message space 310 of CAM input 314. From column 614, the tag value of this RAM output 500b is "2", which the decoder circuit 302 loads into tag space 318 of the new CAM input 314.

By virtue of its tag value (e.g., "2"), this new CAM input 314 is essentially matched against logical CAM 628, which searches for "65" anywhere in the message portion 310 of the input 314. If a "65" is found as shown in the first four rows or entries of logical CAM 628, then the corresponding row or entry 500i-500l of RAM 320 is returned to the decoder circuit 302. Each of these RAM outputs 500i-500l, moreover, has the CPU as its op code (column 618), an instruction-specific data of "2" (column 622) and an asserted done flag (column 620). Accordingly, the decoder circuit 302, in response to any of these RAM outputs 500i-500l, stops processing the message and sends it to the CPU with the instruction to execute subroutine "2".

Returning to logical CAM 624, if the first CAM input 314 did not start with "123456" or "5", then it would still match the third row of logical CAM 624, which has the wildcard or don't care value at each data byte position. Accordingly, the corresponding row 500c of RAM 320 would be provided to the decoder circuit 302, and circuit 302, as directed by the CONT op code from column 618 of this RAM output 500c, continues searching the message. In particular, decoder circuit 302 slides the barrel shifter 308 one increment (e.g., 1 byte) along the message buffer 306, as directed by the "1" in offset column 616, so as to supply a new window to the message space 310 of the next CAM input 314. Decoder circuit 302 also loads the tag space 318 of this new CAM input 314 with the value "1", as directed by the "1" in the tag column 616 of this RAM output 500c.

By virtue of the "1" in the tag portion 318, this next CAM input 314 is essentially matched against all of the entries or rows of logical CAM 626. It should be understood that each CAM input 314 is actually matched against all CAM entries, but by utilizing (e.g., setting) the tag space, matches can only occur to the entries of the selected logical CAM. Logical CAM 626 has been programmed to search for a "55" anywhere in the message space 314 of the respective input. If no "55" is found, the CAM input 314 will still match the last row of logical CAM 626 due to the use of the wildcard or don't care value for each data word. The corresponding row 500h of the RAM 320 directs the decoder circuit 302 to move the barrel shifter 308, but keep the tag value at "1", essentially searching sequential windows of the message for an occurrence of "55". When a "55" is located, the respective RAM outputs 500d-500g direct the decoder circuit 302 to move the barrel shifter 308 by an offset determined by the location at which the "55" is found and to change the tag value to "2", thereby comparing the next segment of the message with the entries of logical CAM 628 (i.e., searching for the occurrence of a "65").

If a "65" is located, the respective RAM outputs 500i-500l for logical CAM 628 direct the decoder circuit 302 to send the message to the CPU along with the identity of program number "2", as indicated in the data column 622. The last entries of logical CAMs 626 and 628 both have the end flag de-asserted as indicated at column 602. Thus, a match to these entries, which causes the decoder circuit 302 to continue searching, means that the barrel shifter 308 has not yet reached the end of the message. Upon reaching the end of the message buffer 306, the decoder circuit 302 preferably asserts the end flag 404 (FIG. 4) of the respective CAM input 314. Thus, if this last message portion 310 fails to include a "55" or a "65", it will not match the last row of either logical CAM 626 or 628 (which have their end flags de-asserted). Instead, this CAM input 314, carrying the last message portion, will only match the one entry of logical CAM 630.

The respective RAM output 500n, moreover, directs the decoder circuit 302 to send the message to the CPU with an instruction to execute program number "1".

As shown, appropriate programming of the CAM 304 and RAM 320 results in the desired actions or treatments being correctly applied to network messages. Furthermore, the configuration of the pattern matching engine 260 of the present invention, including the decoder circuit and the CAM/RAM combination, allows an Ethernet frame payload (e.g., 1500 bytes) to be checked in a matter of microseconds. In particular, by having multiple instances of decoder circuits, message buffers, etc. operating on CAM 304 and RAM 320, as described above, parallel processing can be achieved significantly increasing performance.

Figure 7:
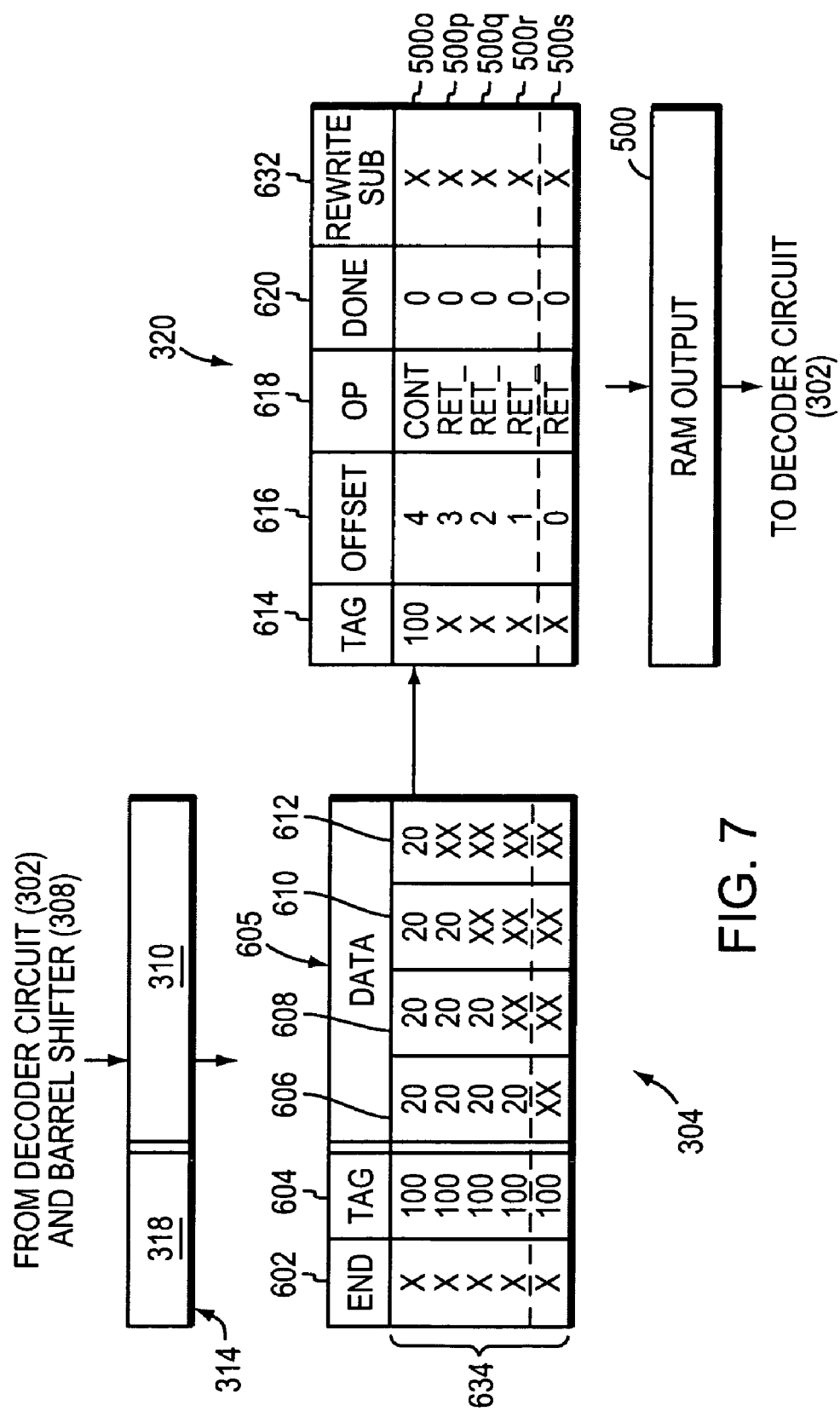

FIG. 7 is a highly schematic partial representation of CAM 304 and RAM 320 programmed to execute a particular subroutine, namely skipping over continuous blank spaces. As described above, CAM 304 and RAM 320 have a plurality of corresponding entries or rows which are organized into a plurality of fields by means of a number of common columns, including end column 602 tag column 604 and data column 605, which includes a series of data unit (e.g., byte) sub-columns 606-612 at CAM 304, and tag column 614, offset column 616, op code column 618, done column 620, and a rewrite subroutine column 632 at RAM 320. By virtue of the values stored in the entries of the tag column 604 (i.e., 100), this portion of CAM 304 corresponds to a logical CAM 634.

Logical CAM 634 preferably operates as follows. Suppose the pattern matching engine 260 is programmed to search for a particular IP address and, upon locating that IP address, to continue searching for one or more URLs contained within the body or data portion of the message. Suppose further that following the IP address are a series of blank spaces of variable length. To quickly skip over the blank spaces and begin searching data for the URL, the pattern matching engine 260 preferably utilizes logical CAM 634. More specifically, upon locating the subject IP address, the respective RAM output 500 is a CALL action. The return tag sub-field contained in this RAM output 500 carries the tag corresponding to that portion of CAM 302 used to search for the desired URL. In accordance with the CALL operation, decoder circuit 302 pushes this return tag onto the subroutine stack 328. The decoder circuit 302 then generates a new CAM input 314 for continuing its search of the respective message. In particular, decoder circuit 302 directs the barrel shifter 308 to slide by one increment and load the corresponding window from message buffer 306 into the message space 310 of this new CAM input 314. Within the tag space 318 of this new CAM input 314, decoder circuit 302 loads the tag specified in the tag value field of the RAM output 500. Since the pattern matching engine 260 is going to be utilizing the blank space skipping logical CAM 634, this tag value is preferably set to "100".

This new CAM input 314 is then provided to CAM 304. By virtue of its tag space 318, input 314 can only be matched to the entries of logical CAM 634. If the entire contents of the message data portion 310 of this input 314 are blank spaces, represented in hexadecimal format as "20", then the input 314 will match for the first row of logical CAM 634. The action of the respective RAM output 500o is CONT, thereby directing the decoder circuit 302 to continue searching the message. Specifically, decoder circuit 302 slides the barrel shifter 308 by four increments to retrieve a new window for loading into message space 310 of the next CAM input 314, as specified by the contents of the offset field corresponding to column 616, and leaves the tag portion of this new input 314 set at "100". Accordingly, this next CAM input 314 is also matched against the entries of logical CAM 634.

This process is repeated until the message data portion 310 of the CAM input 314 includes data rather than blank spaces at any location. Rather than match the first entry of logical CAM 634, which requires blank spaces at all data locations, such a CAM input will match entries 2-5 of logical CAM 634 depending on how many of the data locations carry data rather than blank spaces. As shown, the corresponding RAM outputs 500p-500s are all return (RET) actions. In response, the decoder circuit 302 "pops" the return tag that was previously pushed onto the subroutine stack, and uses this return tag in the tag space 318 of the next CAM input 314. As indicated above, this tag identifies the logical CAM used to search for the desired URL. Decoder circuit 302 also directs the barrel shifter 308 to slide along the message buffer 306 and retrieve a new window for use in loading the message data space 310 of this next CAM input 314. The amount by which the barrel shifter 308 is moved is specified in the offset field of the RET-based RAM output 500, which value is shown in column 616. In order to resume searching precisely where data resumes in the network message, the amount of the offset depends on where the last blank space was located.

As shown, logical CAM 634 efficiently executes a desired subroutine, e.g., skipping blank spaces.

It should be understood that CAM 302 is configured to identify the first matching entry as opposed to all matching entries. Thus, only a single RAM output 500 is provided to the decoder circuit 302 per CAM input 314. Nevertheless, this configuration makes ordering of the CAM (and thus RAM) entries significant during the programming of those devices. In general, more specific matches or rows should be placed ahead of less specific matches or rows (i.e., rows containing more wildcard or don't care entries).

To the extent, a traffic flow utilizes dynamically agreed-upon destination and source ports, the pattern matching engine 260 can be programmed to identify such agreed-upon port numbers so that subsequent messages corresponding to this traffic flow can be treated accordingly. For example, the initial network messages exchanged to set-up a given TCP session can be searched to identify the particular dynamic ports that are selected by the respective entities. These port numbers may then be programmed into the CAM 304 so that subsequent messages corresponding to this traffic flow can be easily identified. It should be understood that multiple messages may be provided to engine 260 for pattern matching. For example, all of the initial set-up messages for a particular TCP session may provided to engine 260 for pattern matching.

The foregoing description has been directed to specific embodiments of this invention. It will be apparent, however, that other variations and modifications may be made to the described embodiments, with the attainment of some or all of their advantages. For example, although the illustrative embodiment of the pattern matching engine 260 has been described in connection with the searching of network messages (e.g., TCP/IP packets and/or data link frames), those skilled in the art will recognize that it may be used to search other data records or files. Therefore, it is an object of the appended claims to cover all such variations and modifications as come within the true spirit and scope of the invention.

What is claimed is:

1. A method for searching network messages for pre-defined regular expressions, the method comprising the steps of:
storing a plurality of pre-defined regular expressions in entries of a content-addressable memory (CAM);
inputting a network message or selected portion thereof to the CAM for comparison with all of the regular expressions stored therein, the comparison with all CAM entries being done at the same time;
returning an output from the CAM; and
identifying, in response to the output, an action to be applied to the given network message or portion thereof that corresponds to a CAM entry matching the inputted network message or selected portion thereof.

2. The method of claim 1, further comprising:
storing one or more actions that are to be applied to network messages matching the respective regular expressions in a memory storage device; and
operating the memory storage device in interaction with the CAM.

3. The method of claim 1, further comprising:
appending a tag to the network message or selected portion thereof that is input to the CAM;
defining a single logical CAM within the CAM for all CAM entries having the same tag value; and
constraining the matching of a given CAM input having a tag value to the CAM entries corresponding to the tag value.

4. The method of claim 1, further comprising:
using as the CAM a ternary content addressable memory (TCAM);
storing one or more actions that are to be applied to network messages matching the respective regular expressions in a random access memory (RAM).

5. The method of claim 1, further comprising:
configuring a barrel shifter to provide a selected portion of a network message to the CAM.

6. The method of claim 5, further comprising:
configuring a second barrel shifter to apply a selected portion of a second network message to a decoder circuit in parallel fashion with the network message, the decoder circuit using the CAM.

7. The method of claim 1, further comprising:
providing in an input to the CAM a message data space for storing the network message or portion thereof provided by a barrel shifter, a tag space for storing the selected tag, and an end flag indicating whether the message data space contains a last segment of the respective network message.

8. The method of claim 1, further comprising:
returning in the output from the CAM an identification of the action to be applied to the respective network message; and
in the event that further searching is to be performed on the respective network message, providing an offset for use in directing a barrel shifter to select a new message portion for a subsequent CAM input and a tag to be appended to the subsequent CAM input.

9. The method of claim 1, further comprising:
returning in the output from the CAM a done flag, which if asserted indicates that processing of the respective message is complete.

10. The method of claim 1, further comprising:
configuring a logic circuit to extract one or more selected fields from network messages and to append those selected fields to the respective network messages prior to inputting the messages to the CAM.

11. The method of claim 1, further comprising:
receiving a network message having two tags; and
storing a second tag while the message is searched under a first tag.

12. The method of claim 1, further comprising:
actuating a counter in response to an action performed on a network message.

13. The method of claim 1, further comprising:
storing in a memory device the action to be applied to the network message in the event that the network message matches one of the CAM entries.

14. A pattern matching engine apparatus for use in searching network messages for pre-defined regular expressions, comprising:
a content-addressable memory (CAM) having a plurality of entries containing the pre-defined regular expressions;
a decoder circuit configured to control an input to the CAM, the input including a given network message or selected portion thereof for comparison with the regular expressions contained within the CAM; and an output from the CAM, that identifies an action to be applied to the given network message or portion thereof, and the CAM configured such that each network message or portion thereof input to the CAM is compared against all CAM entries at the same time, allowing high-speed pattern matching of network messages.

15. The apparatus of claim 14, further comprising:
a memory storage device to store one or more actions that are to be applied to network messages matching the respective regular expressions; and
wherein the memory storage device is configured to interact with the CAM.

16. The apparatus of claim 14, further comprising:
a tag to appended to the network message or selected portion thereof that is input to the CAM;
a single logical CAM within the CAM having all CAM entries that have the same tag value; and
means for constraining the matching of a given CAM input having a tag value to the CAM entries corresponding to the tag value.

17. The apparatus of claim 14, further comprising:
a ternary content addressable memory (TCAM) used as the CAM; and
a random access memory (RAM) to store one or more actions that are to be applied to network messages matching the respective regular expressions.

18. The apparatus of claim 14, further comprising:
a barrel shifter to provide a selected portion of a network message to the CAM input.

19. The apparatus of claim 18, further comprising:
a second barrel shifter to apply a selected portion of a second network message to a decoder circuit in parallel fashion with the network message, the decoder circuit using the CAM.

20. The apparatus of claim 14, further comprising:
an input to the CAM having a message data space for storing the network message or portion thereof provided by a barrel shifter, a tag space for storing a selected tag, and an end flag indicating whether the message data space contains a last segment of the respective network message.

21. The apparatus of claim 14, further comprising:
an identification of the action to be applied to the given network message returned in the output from the CAM; and
an offset for use in directing the barrel shifter to select a new message portion for a subsequent CAM input and a tag to be appended to the subsequent CAM input, in the event that further searching is to be performed on the given network message.

22. The apparatus of claim 14, further comprising:
a done flag returned in the output from the CAM, and the done flag indicating if asserted that processing of the respective message is complete.

23. The apparatus of claim 14, further comprising:
a logic circuit to extract one or more selected fields from network messages and to append those selected fields to the respective network messages prior to inputting the messages to the CAM.

24. The apparatus of claim 14, further comprising:
two tags attached to a received network message; and
a memory to store a second tag while the message is searched under a first tag.

25. The apparatus of claim 14, further comprising:
a counter actuated in response to an action performed on a network message.

26. The apparatus of claim 14, further comprising:
a memory device to store the action to be applied to the network message in the event that the network message matches one of the CAM entries.

27. A pattern matching engine apparatus for use in searching network messages for pre-defined regular expressions, comprising:
means for storing a plurality of pre-defined regular expressions in entries of a content-addressable memory (CAM);
means for inputting a network message or selected portion thereof to the CAM for comparison with all of the regular expressions stored therein, the comparison with all CAM entries being done at the same time;
means for returning an output from the CAM; and
means for identifying, in response to the output, an action to be applied to the given network message or portion thereof that corresponds to a CAM entry matching the inputted network message or selected portion thereof.

28. The apparatus of claim 27, further comprising:
means for storing one or more actions that are to be applied to network messages matching the respective regular expressions in the memory storage device; and
means for operating the memory storage device in interaction with the CAM.

29. The apparatus of claim 27, further comprising:
means for appending a tag to the network message or selected portion thereof that is input to the CAM;
means for defining a single logical CAM within the CAM for all CAM entries having the same tag value; and
means for constraining the matching of a given CAM input having a tag value to the CAM entries corresponding to the tag value.

30. The apparatus of claim 27, wherein the CAM is a ternary content addressable memory (TCAM) and the apparatus further comprises:
means for storing one or more actions that are to be applied to network messages matching the respective regular expressions in a random access memory (RAM).

31. The apparatus of claim 27, further comprising:
means for configuring a barrel shifter to provide a selected portion of a network message to the CAM.

32. The apparatus of claim 27, further comprising:
means for configuring a second barrel shifter to apply a selected portion of a second network message to a decoder circuit in parallel fashion with the network message, the decoder circuit using the CAM.

33. The apparatus of claim 27, further comprising:
means for providing in an input to the CAM a message data space for storing the network message or portion thereof provided by a barrel shifter, a tag space for storing the selected tag, and an end flag indicating whether the message data space contains a last segment of the respective network message.

34. The apparatus of claim 27, further comprising:
means for returning in the output from the CAM an identification of the action to be applied to the respective network message; and
in the event that further searching is to be performed on the respective network message, means for providing an offset for use in directing the barrel shifter to select a new message portion for a subsequent CAM input and a tag to be appended to the subsequent CAM input.

35. The apparatus of claim 27, further comprising:
means for returning in the output from the CAM a done flag, which if asserted indicates that processing of the respective message is complete.

36. The apparatus of claim 27, further comprising:
means for configuring a logic circuit to extract one or more selected fields from network messages and to append those selected fields to the respective network messages prior to inputting the messages to the CAM.

37. The apparatus of claim 27, further comprising:
means for receiving a network message having two tags; and
means for storing a second tag while the message is searched under a first tag.

38. A computer readable media, comprising:
said computer readable media containing instructions for execution on a processor for the practice of a method for searching network messages for pre-defined regular expressions, the method having the steps of,
storing a plurality of pre-defined regular expressions in entries of a content-addressable memory (CAM);
inputting a network message or selected portion thereof to the CAM for comparison with all of the regular expressions stored therein, the comparison with all CAM entries being done at the same time;
returning an output from the CAM; and
identifying, in response to the output, an action to be applied to the given network message or portion thereof that corresponds to a CAM entry matching the inputted network message or selected portion thereof.

* * * * *

UNITED STATES PATENT AND TRADEMARK OFFICE
CERTIFICATE OF CORRECTION

PATENT NO. : 7,395,332 B2
APPLICATION NO. : 11/085768
DATED : July 1, 2008
INVENTOR(S) : Silvano Gai It is certified that error appears in the above-identified patent and that said Letters Patent is hereby corrected as shown below:

Col. 1, Line 47, please replace "Protocol)/Internet" with "Protocol/Internet"

Col. 4, Line 50, please replace "S1)-S5" with "S1-S5"

Col. 7, Line 5, please replace "S1)" with "S1"

Col. 9, Line 38, please replace "TCPIUDP" with "TCP/UDP"

Signed and Sealed this

Twenty-sixth Day of October, 2010

David J. Kappos
*Director of the United States Patent and Trademark Office*